FIG. 2
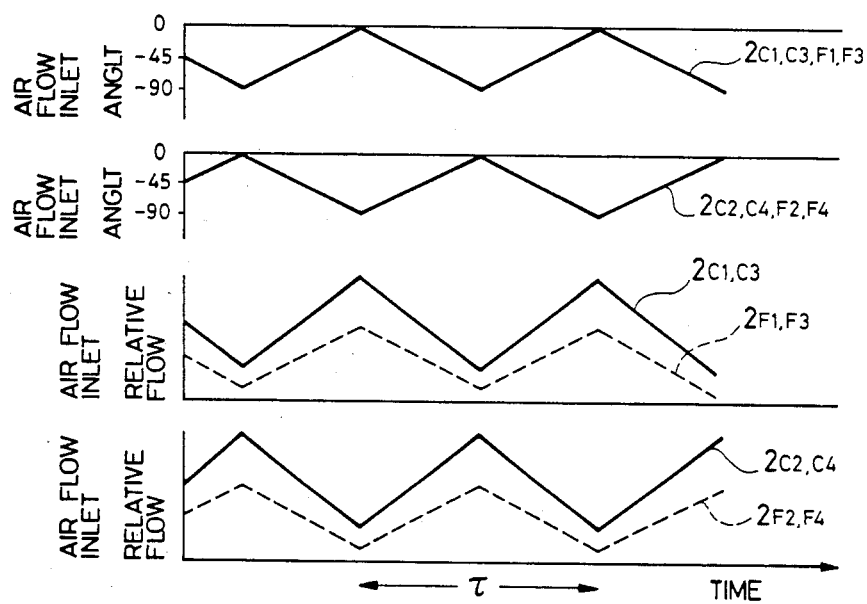
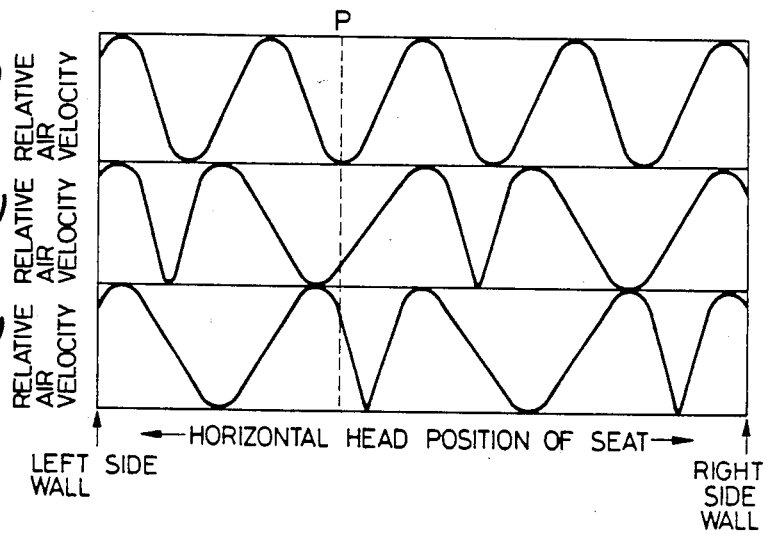

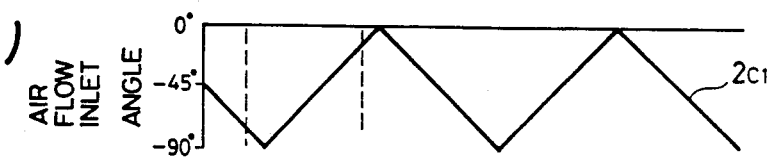
FIG. 16(a)
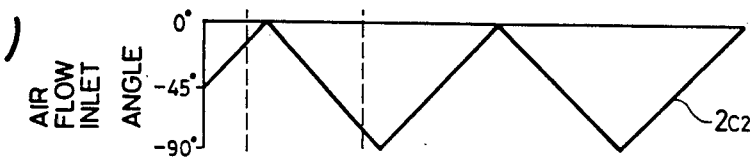
FIG. 16(b)
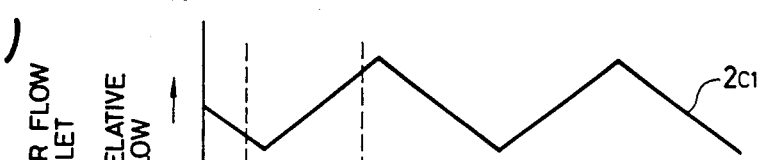
FIG. 16(c)
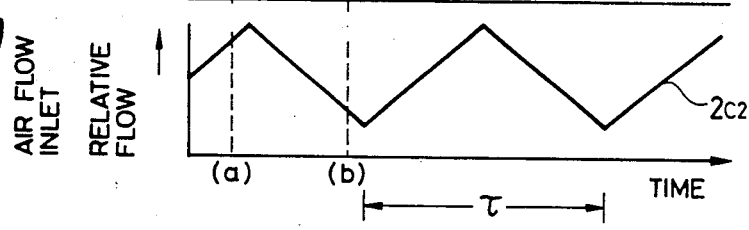
FIG. 16(d)
FIG. 17

METHOD OF AIR-CONDITIONING AND SYSTEM FOR THE SAME

BACKGROUND OF THE INVENTION

The present invention relates to a method of air-conditioning and a system for the same.

A conventional type of air conditioner for railroad cars is described first as one example of a known system which is closely allied to the present invention. Ten or eleven small air conditioners are disposed and mounted on the ceiling of the passenger accommodation in a train car in the longitudinal direction thereof. Each air conditioner has four air outlets and four air inlets disposed in the ceiling. When this type of air conditioner operates to cool the passenger accommodation, namely, a space to be air-conditioned, cooled air is blown through each outlet to the center of the passenger accommodation, thereby cooling the same, and the air in this space is thereafter drawn in through the corresponding inlet. According to this method, two circulating flows are generated, as viewed in the transverse direction of the car. The position of each of these two circulating flows is fixed, and the wind velocity generally decreases as the circulating flow approaches the center thereof. The approximate head height of each passenger seat is about half the height of the passenger accommodation space, and the position of the seat which is nearest to the center of the circulating flow corresponds to the center of the circulating flow is such that the wind velocity at this seat is smaller than that at other seats. Therefore, the air-conditioning effect is reduced in this position, and the unpleasantness of the unsatisfactorily air-conditioned atmosphere experienced by the passenger on this seat is increased. Moreover, air-conditioning is not effected in regions to which the circulating flow fails to reach, since the position at which each circulating flow is generated is fixed. In particular, an excessively cooler layer of air stagnates in the vicinity of the floor in the central regions, so that a cold atmosphere region tends to form near the floor. It is thus difficult to provide uniform temperature distribution throughout the passenger accommodation and to assure pleasant conditions for the passengers.

Japanese Patent Laid-Open No. 192663/1984, for example, discloses a related system of this type in which the wind blown through an outlet formed on the ceiling forms two circulating flows in the transverse direction of the car on both sides of the center thereof so that the passengers are not directly exposed to the flows. In this arrangement, the positions of two circulating flows in the transverse direction section are fixed so that a cold atmosphere region tends to occur near the floor surface, and a hot atmosphere region tends to occur near the ceiling at the time of heating. As the positions of these circulating flows are fixed, the cooling effect thereof is not stimulating to the human body and the passengers can not feel cool.

Thus, the conventional methods of air-conditioning are not fully able to provide proper air-conditioning effects.

These problems also occur in the case of air-conditioning in theaters or large-size refrigerators.

SUMMARY OF THE INVENTION

It is an object of the present invention to provide uniform temperature distribution in a space to be air-conditioned and to improve the air-conditioning efficiency.

To this end, the present invention provides a method of air-conditioning which forms, in a space to be air-conditioned, a plurality of circulating flows of air respectively blown through air outlets of an air-conditioning system disposed at predetermined positions within this space and which successively repeats two steps: a first step of changing the effective range of at least one of the circulating flows; and a second step of returning that circulating flow or flows as effected in the first step to the effective range thereof which obtained before the first step. The invention also provides an air-conditioning system which forms, in a space to be air-conditioned, a plurality of circulating flows of air respectively blown through air outlets of an air-conditioning system disposed at predetermined positions within the space and which comprises: a means for changing the effective range of at least one of the circulating flows and returning that circulating flow or flows as changed to the effective range thereof which obtained before the range was changed; and a means for conducting the repetition of the two effects of the above means.

BRIEF DESCRIPTION OF THE DRAWINGS

FIG. 2 shows graphs of periodical changes of the blowing angle and the flow rate of air currents blown through the air outlets shown in FIGS. 1(a), 1(b) and 1(c);

FIGS. 3a, 3b, 3c shows graphs of the flow velocity of the air current flowing around the head of a man in the states shown in FIGS. 1(a), 1(b) and 1(c);

32b are determined by those of the flows in the nozzles 34a and 34b. The flow angles at the outlets $2_{C1}$ and $2_{C2}$ are periodically changed by the control circuits 22a and 22b and the outlet conduit drivers 33a and 33b. The output generation periods of the regulation period generators 22a and 22b are shifted from each other by a half period in order to effect changes of the outlet flow angle periods.

Figure 11:
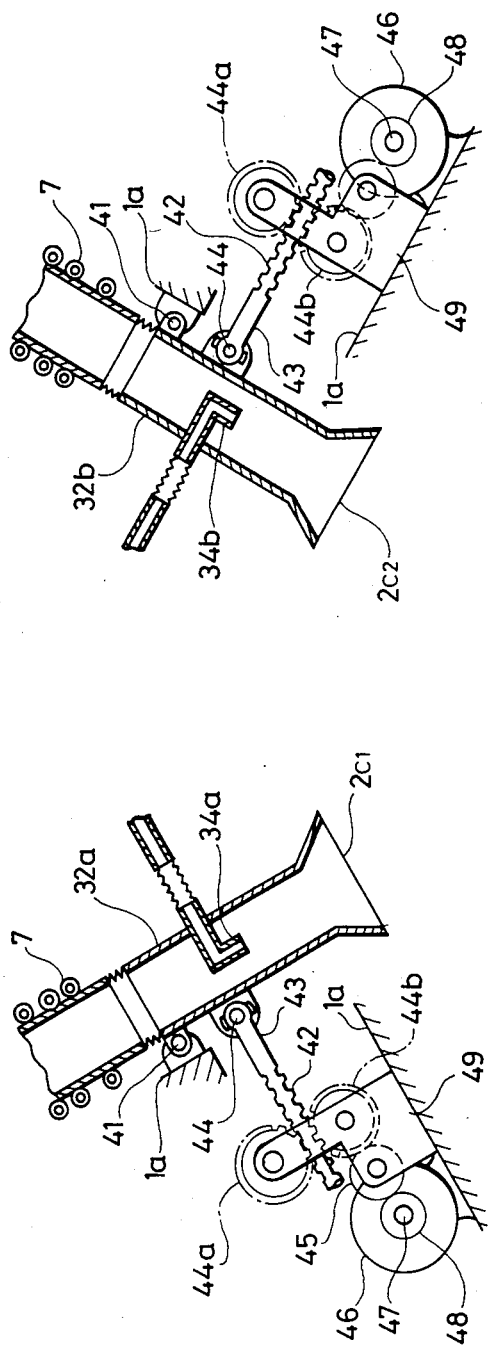
FIG. 11 is an elevational view of a detail of the structure of a portion 33a shown in FIG. 10.

The arrangements of the drivers 33a and 33b are such as shown in FIG. 11. The conduit 32a is rotatably supported by a rotational shaft 41 mounted on the ceiling 1a. A rod 43 on which racks 42 are formed is connected to the conduit 32a by a rotational shaft 44. This rod 43 is pinched by two gears 44a and 44b engaging with the racks 42 while preventing the disengagement thereof. The gear 44b engages with a gear 45 which engages with a gear 48 fixed to a rotational shaft 47 of the electric motor 46. The electric motor 46 is mounted on the ceiling 1a, and the gears 44a, 44b and 45 are disposed on a frame 49 which is secured on the ceiling 1a. As shown in FIG. 11, the rotational shaft 44 passes through an elongated aperture 50, thereby preventing an excessive bending force for the rod 43 during the rotational movement of the conduit 32a about the rotational shaft 41.

Figure 12:
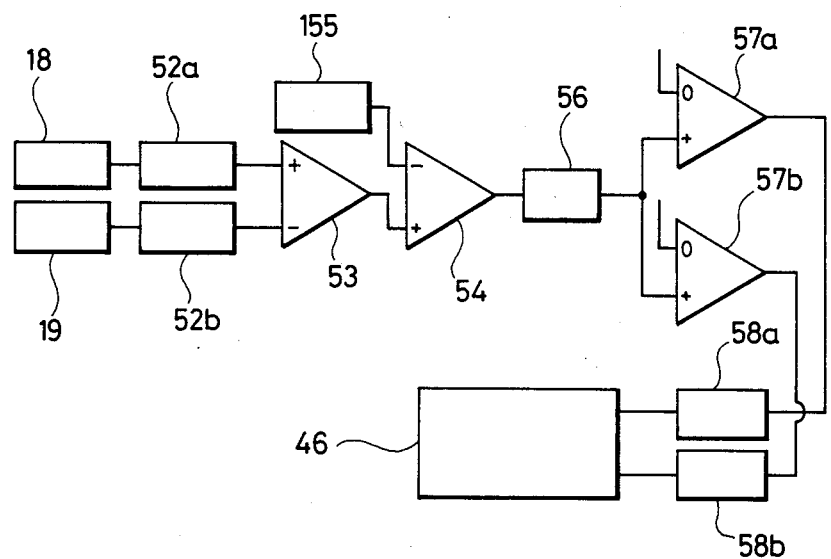
FIG. 12 is a circuit block diagram of an example of a portion 22a shown in FIG. 10.

The arrangement of the control circuit 22a is such as shown in FIG. 12. The output of the temperature detector 18 disposed as shown in FIG. 12 is amplified by the amplifiers 52a and 52b. The outputs of the amplifiers 52a and 52b undergo subtractions of the subtracter 53 so as to supply an output corresponding to the temperature difference. The output of the subtracter 53 undergoes subtraction with the output of a temperature setting device 55 through a subtracter 54, thereby putting out the differential output of the temperature setting device 55 and the subtracter 53. The output of the subtracter 54 is supplied to a differentiation circuit 56 which detects whether this value is larger or smaller than a value which was supplied a unitary time before. When the present value is larger, the differentiation circuit 56 puts out a positive signal. When the present value is smaller, the circuit 56 puts out a negative signal. If a positive signal is put out by the differentiation circuit 56, it is supplied to two comparators 57a and 57b. Since the comparator 57a is adapted for reacting to positive input signals while the other comparator 57b reacts to negative signals, the comparator 57a alone reacts in this case, and operates a normal rotation control circuit 58a so as to rotatingly drive the motor 46 in the normal direction. If a negative signal is put out by the differentiation circuit 56, the comparator 57b reacts to operate a reverse rotation control circuit 58b, thereby rotatingly driving the motor 46 in the reverse direction.

When the motor rotates in the normal direction, the rotational force of the motor 46 is transmitted to gears 48, 45 and 44b so as to linearly retract the rack 42 to the left hand side of FIG. 11, thereby rotating the conduit 32a about the rotational shaft in the leftward direction, as viewed in FIG. 11. When the motor rotates in the reverse direction, it makes the rack 42 project to the right hand side, thereby rotating the conduit 32a in the rightward direction.

Thus, the conduit 32 is swung from side to side in accordance with the difference between the temperatures on the floor and ceiling sides, and the direction of the outlet $2_{C1}$ is thereby changed so as to move the stagnating layers of air on the floor and ceiling sides leftwardly and rightwardly while reducing the sizes of the same.

The diaphragm driver 35 is constituted by utilizing the almost entire construction of the driver shown in FIG. 11, and the movement of the rod 43 of FIG. 11 is changed into the up-and-down movement of a diaphragm plate 59 of the diaphragm 30.

The control circuit 22a for the diaphragm driver 35 is the same as that shown in FIG. 12. When the diaphragm plate 59 is moved down by the control operation of this controller 22a, the pressure on the $P_1$ side is increased and the pressure on the $P_2$ side is decreased. When, in this state, the liquid introduced from the blower 8 into the flip-flop pure fluid control device 31, a larger amount of air from the blower 8 is distributed to the nozzle 34b, so that the flow rate is set to be large at the outlet $2_{C2}$ and small at the outlet $2_{C1}$. Conversely, when the diaphragm is moved up, the relationship between the pressure levels at the ports A and B is reversed, so that the flow rate is small at the outlet $2_{C2}$ and large at the outlet $2_{C1}$.

Figure 10:
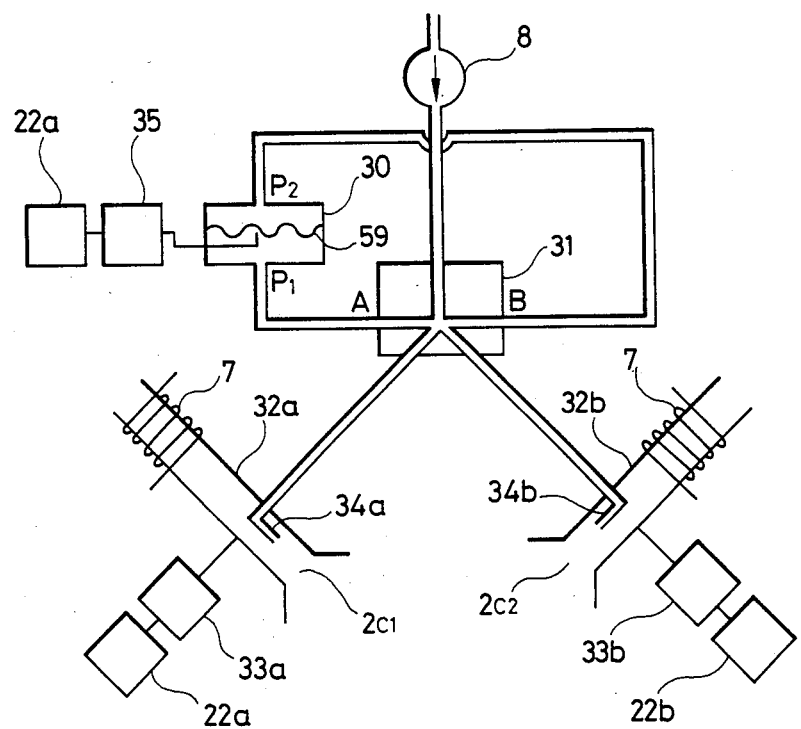
FIG. 10 is an elevational view of a device in accordance with the present invention for changing both the wind velocity and angle components of the vector of air currents.

The conduit 32b and the driver 33b shown in FIG. 10 are symmetrically arranged relative to the conduit 32a and the driver 33a. In order to provide such sizes and dispositions of vortices as indicated in FIGS. 1(a), 1(b) and 1(c), it is necessary to rotate the conduit 32b leftwardly in accordance with the leftward rotation of the conduit 32a. To achieve this related rotation, the drivers 33a and 33b are arranged and disposed symmetrically. The control circuit 22a for the driver 33b is the same as that shown in FIG. 12. The period of leftward and rightward swinging movements of the conduits 32a and 32b or the period of the change of the relationship between the flow rates at the outlets $2_{C1}$ and $2_{C2}$ may be altered by changing the output of the temperature setting device 55. These periods may be depend upon the cooling or heating capacity of the air-conditioning system relative to the interior space.

The present invention has been described with respect to the arrangements in which both the flow rate and angle of an outlet flow are regulated, but it is possible to change the flow rate or the outlet flow angle alone, thereby changing the size of vortices and moving the center of each vortex.

Examples in accordance with the present invention which changes the output flow angle alone will be described below.

Figure 6:
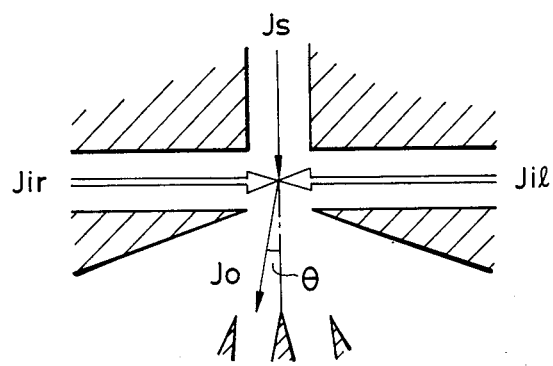
FIG. 6 is a cross sectional view of the principle underlying the function of a device in accordance with the present invention for specifically changing the angle component alone of the vector of air currents.

FIG. 6 shows a deflection characteristic observed when a jet flow is formed by employing a pure flow control device. When, as shown in FIG. 6, a main jet flow having a momentum $J_s$ assumed to collide against control flows having momentums $J_{ir}$ and $J_{il}$, thereafter having a momentum $J_o$, the following equations are obtained by vectorial operations.

$$J_s = J_o \cos\theta$$

$$\theta = \tan^{-1} \frac{J_{il} - J_{ir}}{J_s}$$

The deflection angle $\theta$ by which the main jet flow is deflected can be obtained from these equations.

Figure 7:
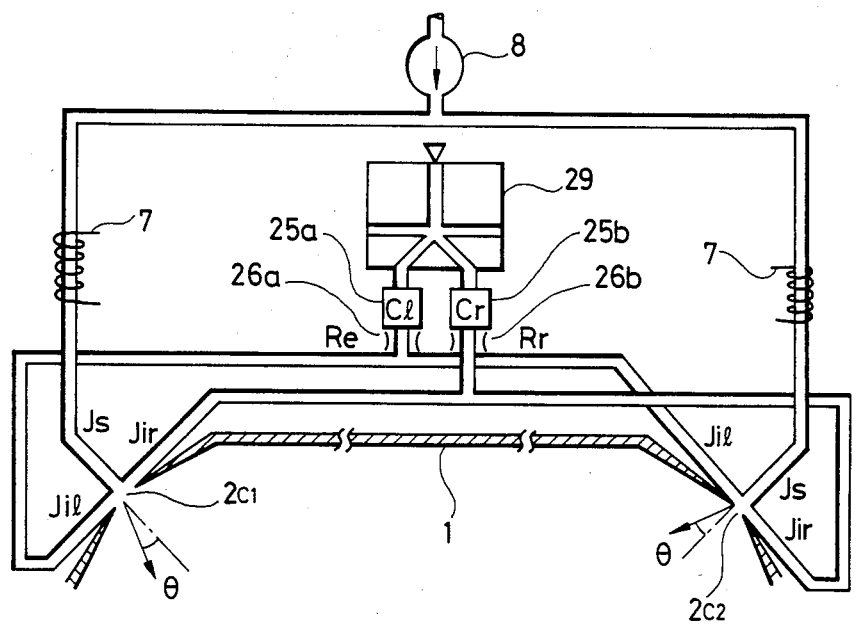
FIG. 7 is an elevational view of a system for changing the direction of air currents by employing the device of FIG. 6.
Figure 8:
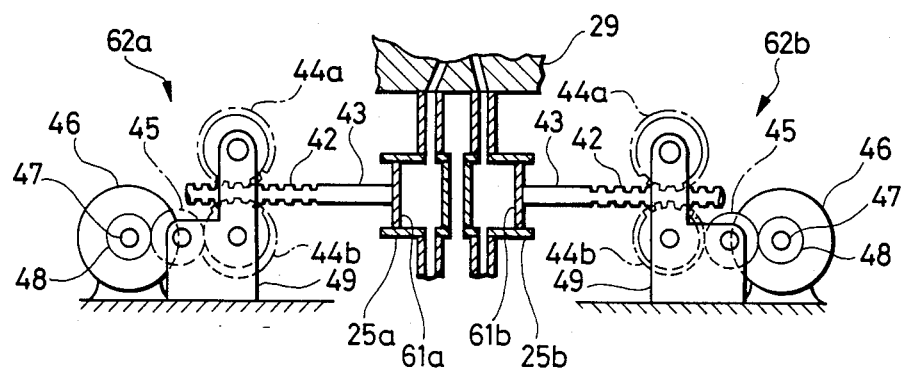
FIG. 8 is an elevational view of a detail of portions 25a and 25b shown in FIG. 7.
Figure 9:
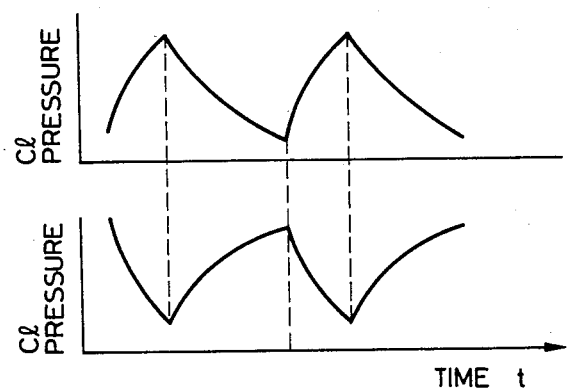
FIG. 9 shows graphs of the internal pressures of the portions 25a and 25b shown in FIG. 7.

FIG. 7 shows still another embodiment of the present invention which employs a pure fluid control device to periodically control the outlet flow angle at two outlets. A load oscillator 29 has capacities Cl25a, Cr25b and load resistances Rl26a, Rr26b. The capacities Cl25a and Cr25b respectively represent space volumes, and the load resistances Rl26a and Rr26b represent, for example, orifices. FIG. 8 shows the output characteristics of the load oscillator 29. When, for example, the air flows while being attached to the left side, the flow of air issues after passing through the capacity Cl25a and the resistance Rl26a. The internal pressure of the capacity Cl25a is increased by the difference between the flow rate of a flow entering from the output port of the device and the flow rate of the flow issuing through the orifice. When the pressure is increased to a limit whereby the attached flow is maintained, the flow is switched to the right. After it has switched, a similar pressure buildup is effected with respect to the right capacity Cr25b. Meanwhile, the internal pressure of the left capacity Cl25a is decreased. The pressure wave formed in the left and right cavities are such as shown in FIG. 9. When these pressure wave forms are employed, the down stream flows relative to the capacities Cl25a and Cr25b, namely, momentums exhibit variations corresponding to these pressure wave forms, so that these momentums can be utilized as control momentums $J_{il}$ and $J_{ir}$, as shown in FIGS. 6 and 7. That is, at the outlets $2_{C1}$ and $2_{C2}$ in the arrangement shown in FIG. 7, the main jet flows are deflected by the control momentums $J_{il}$ and $J_{ir}$ directly coupled with the outputs of the load oscillator. Each main jet flow is deflected in accordance with the period of the pressure wave form such as shown in FIG. 9.

The regulation of the periods shown in the graphs of FIG. 9 is effected by moving pistons 61a and 61b in the chambers and changing the volume of each chamber. FIG. 8 shows the piston 61a and 61b and drivers 62a and 62b for the pistons 61a and 61b. As shown in this figure, the driver 62a has the same construction as that of the driver of FIG. 11, and the structure and disposition of the drivers 62a and 62b exhibit an axial symmetry.

A control circuit for controlling the motor 46 of the driver 62a is the same as that shown in FIG. 12. If the temperature difference between the temperatures on the ceiling and floor sides largely differs from a temperature set by the temperature setting device 55, the control circuit judges whether or not the former is approaching the latter, by using the differentiation circuit 56, thereafter rotating the motor 46 in the normal or reverse direction. When the motor 46 of the driver 62a rotates in the normal direction, the rod 43 of the driver 62a is retracted to the left hand side in FIG. 8 and the piston 61a is thereby moved left so that the capacity Cl25a is increased. When the motor 46 rotates in the reverse direction, the capacity Cl25a is reduced.

A control circuit for controlling the motor 46 of the driver 62b has the same arrangement as that shown in FIG. 12 but includes an additional constituent, namely, a signal inverter for inverting the polarity of a signal which is inserted between the differentiation circuit 56 and the comparators 57a and 57b. By employing such a circuit with a signal inverter as a control circuit for controlling the motor 46 of the driver 62b, it is possible to provide a relationship between the rotations of the motors 46 of the drivers 62a and 62b such that the motor 46 of the driver 62a rotates in the normal direction while the motor 46 of the driver 62a rotates in the reverse direction, and the former rotates in the reverse direction while the latter rotates in the normal direction.

Therefore, when the piston 61a is moved to the left hand side, the piston 61b is reversely moved to the right hand side so that the capacity Cl25a increases and the capacity Cr25b simultaneously increases by the same amount. Conversely, when the capacity Cl25a decreases, the capacity Cr25b also decreases.

When the capacities Cl25a and Cr25b are increased, the period indicated in FIG. 9 is thereby increased. When the capacities are decreased, the period is decreased. To further effect a change of this period, the temperature setting of the temperature setting device shown in FIG. 28 may be altered.

This arrangement enables the outlet flow angles ($\theta$) of the outlet $2_{C1}$ and $2_{C2}$ to be changed periodically, thereby effecting the periodical transference of vortices and the change of sizes of the same.

If it is desirable to change the air flow rate in the arrangement of FIG. 7, a flow rate regulating valve may be disposed at an intermediate portion of the passage for each main jet flow, the valve opening thereof being regulated as desired. The regulation of the valve opening may be carried out in such a manner that the flow passage for one of the main jet flows led to the outlet for generating a smaller vortex is throttled to an extent greater than the other main jet flow led to the outlet for generating a larger vortex.

For the regulation of the outlet flow angle and flow rate, means other than the pure fluid control devices, namely, louvers, for example, may be mechanically rotated so as to change the outlet flow angle while regulating the outlet flow rate by the valve adjustment.

Figure 13A:
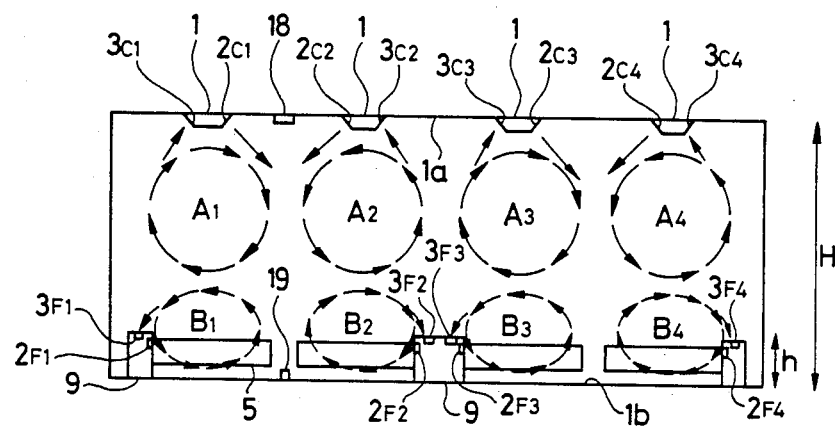
FIGS. 13(a), 13(b) and 13(c) are elevational views of another embodiment of the present invention in which the change of each of the circulating flows in a theater are observed respectively in the states (a), (b) and (c)
Figure 13B:
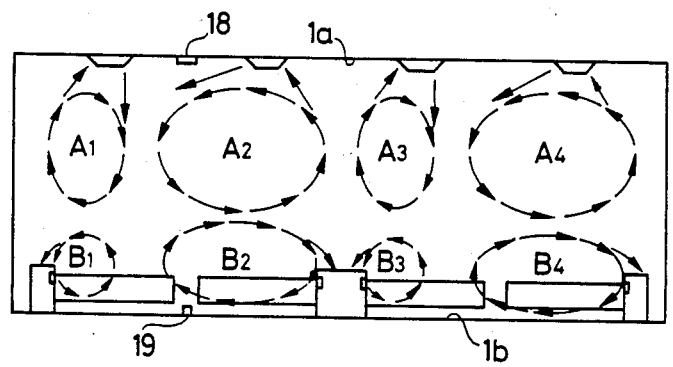
Figure 13C:
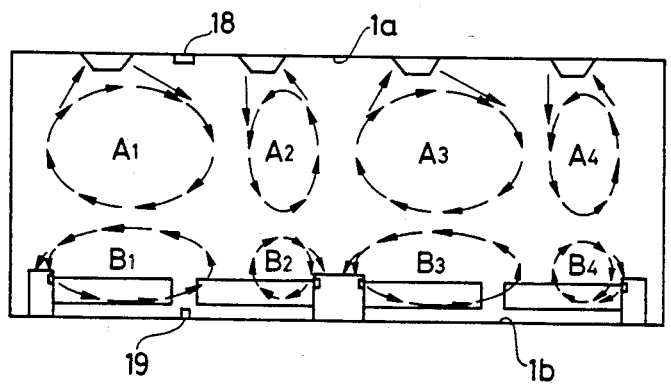

FIG. 13 shows the cooling operation of a air-conditioning system for a theater embodying the present invention. Reference numerals 9 and 5 respectively denote air ducts and audience seats. This embodiment arranges the floor outlets $2_{F1 \sim 4}$ in positions different form those in the embodiment shown in FIG. 1. Each air duct 9 having the floor outlet $2_{F1}$ and the floor inlet $3_{F2}$ is adjacent to the audience seats. In the arrangement shown in FIG. 13, the flow angle and flow rate at each of the ceiling outlets $2_{C1 \sim C4}$ are changed in accordance with the graph of FIG. 2, but, in this case, it is not necessary to change the flow angles at the floor outlets $2_{F1 \sim F4}$, and the angle thereof is set at 45° below the horizontal. The flow rate at each of the floor outlets $2_{F1 \sim F4}$ is changed in accordance with the graph of FIG. 2. Basically, this arrangement generates circulating flows $A_1$ to $A_4$ and $B_1$ to $B_4$ similar to those shown in FIG. 1. As shown in FIGS. 13(b) and 13(c), the size and the center position of each circulating flow are changed by altering the flow angle and flow rate at the ceiling outlets $2_{C1 \sim C4}$ and the flow rate at the floor outlets $2_{F1 \sim F4}$. Values of the flow velocity measured at the head position on the audience seats (at a height h from the floor) are substantially the same as those shown in FIG. 3. The audience can feel comfortable as the flow velocity changes.

In order to realize the flow pattern shown in FIG. 13, the flow angles and the flow rates at the ceiling outlets $2_{C1}$ and $2_{C2}$, $2_{C3}$ and $2_{C4}$ can be controlled by the embodiment shown in FIG. 10. In this case, it is not necessary to carry out the angle control for the floor outlets $2_{F1 \sim F4}$ and, therefore, the conduit drivers such as those provided in the embodiment shown in FIG. 10. However, the pattern can be realized by the arrangement shown in FIG. 10.

FIG. 13 specifically illustrates a flow pattern in a vertical cross section of a theater, but the present invention is also applicable when the ceiling is horizontal; and the floor is stepped; and the height H of the ceiling from the floor is small. By changing the flow rate at the ceiling outlets $2_{C1 \sim C4}$, the sizes of the circulating flows $A_{1-4}$ can be changed while fixing the sizes of the circulating flows $B_{1-4}$, thereby maintaining the comfortableness. The height H of the ceiling on ordinary second floor audience seats is small. In that case, air-cooling may be effected by employing only the circulating flows $A_{1-4}$ shown in FIG. 13, and the floor outlets $2_{F1-F4}$ are not necessary.

Figure 14:
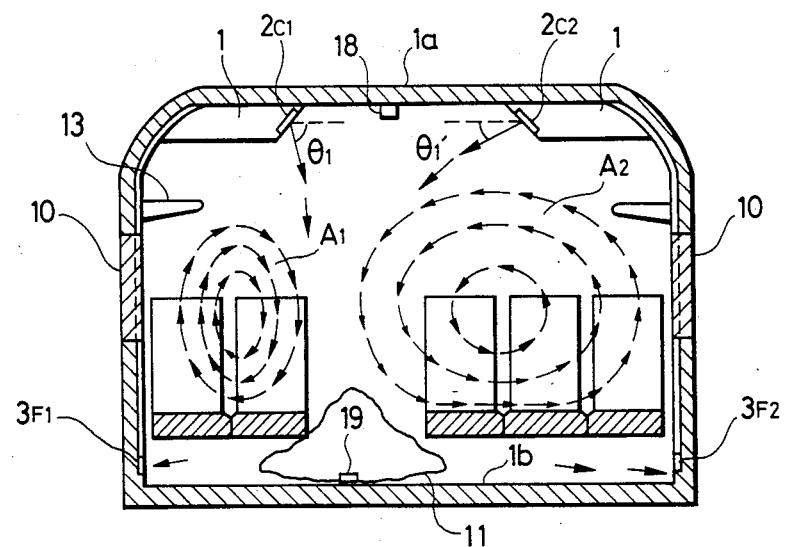
FIG. 14 is an elevational view of still another embodiment of the present invention showing circulating flows of air currents in the passenger accommodation of a railroad car.
Figure 15:
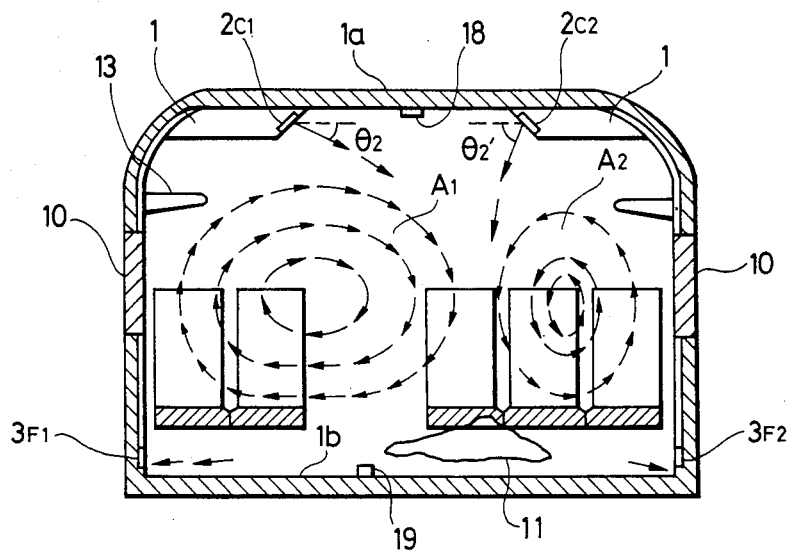

The cooling operation of an air-conditioning system for a train passenger car, namely, a mobile space for passengers will be described below. FIGS. 14 and 15 show in transverse cross section a passenger accommodation of the train passenger car. Since the distance between the ceiling and the floor in the passenger car is small along with the width thereof compared with those of theaters, it is sufficient to provide two ceiling outlets $2_{C1}$ and $2_{C2}$. The inlets $3_{F1, 2}$ are formed in the vicinity of the floor.

In this embodiment, air is blown through the outlets $2_{C1, 2}$ on the side of the ceiling $1a$ so as to form two flows both flowing in the directions toward the aisle. The blowing angle of the outlet $2_{C1}$ of FIG. 12 is $\theta_1$ below the horizontal, and the angle of the outlet $2_{C2}$ is only $\theta_1'$. The air flow distribution in the transverse direction of the train car in this arrangement was obtained by an analysis program for analyzing flows of an incompressible and viscous fluid. This analysis program is used to calculate the formula of conservation of mass, momentum and energy with respect to an incompressible and viscous fluid on the basis of the finite difference method. The calculation was performed by assuming that the outlet flow velocity is 2 m/s; the outlet temperature is 7° C.; the ambient air temperature is 30° C.; and the outlet flow rates at two outlets are the same. As a result, it was confirmed that two circulating flows having different sizes were generated, as shown in FIGS. 14 and 15. The flow velocity at the approximate head position on each seat (head position of a sitting passenger) in this embodiment is different from that provided by conventional methods. In the state illustrated in FIG. 14, a cold atmosphere region 11 occurs near the floor surface $1b$ if the outlet flow angle as indicated in this figure is maintained.

The results of this calculation obtained when the angles of the outlets $2_{C1}$ and $2_{C2}$ are changed are such as shown in FIG. 15. That is, larger circulating flows are formed on the side of the three adjacent seats and a smaller circulating flows are formed on the side of the two adjacent seats. This relationship is reverse to that shown in FIG. 14. As the outlet flow angles are changed, the centers of the two circulating flows occurring in the transverse direction of the car are moved in the horizontal and transverse direction, as is understood from the comparison between the results shown in FIGS. 14 and 15. Moreover, the cold atmosphere region 11 generated in the vicinity of the floor as shown in FIG. 14 is destroyed or reduced by the effects of the movement of each circulating flow center and the change of each circulating flow size.

The outlet flow rates at the outlets $2_{C1}$ and $2_{C2}$ on the side of the ceiling $1a$ are the same in both cases as illustrated in FIGS. 14 and 15, but circulating flows different in size can also be generated when the outlet flow rates, namely. Flow velocities at the outlets $2_{C1}$ and $2_{C2}$ are varied while setting the outlets $2_{C1}$ and $2_{C2}$ at the same angle. That is, larger circulating flows are formed in the space beneath the outlet though which air flows at a larger flow rate.

When, as in the case of this embodiment, the center of a circulating flow is located at the head position on a seat, the flow velocity may not change largely at the head position on some seats no matter how the size of the generated circulating flow may be. To prevent this problem, it is most effective to change the outlet angles while setting a higher air flow rate or flow velocity on the side of the outlet where a larger circulating flow occurs, thereby increasing the flow velocity at the head position on the seat.

FIGS. 16a, 16b, 16c, 16d shows an example of regulation of the angle and flow rate at the two outlets $2_{C1}$ and $2_{C2}$, which sets a constant summation of these outlet angles of, for instance, 90°.

FIG. 17 shows the flow velocity distribution in the horizontal and transverse direction of the car at the head height of the passenger seat. In this figure, the solid line indicates the flow velocity value measured when the outlet angles of FIGS. 12 and 13 are varied, and the broken line indicates the flow velocity value measured when the outlet flow angle and rate of FIG. 14 are varied simultaneously. If flow velocity distribution such as indicated by the broken line in FIG. 15 is provided, the flow velocity of the large diameter circulating flow at the head position on each seat in increased, and, simultaneously, the variations of the flow velocity effected by the movement of the circulating flow center are maintained. These variations of the flow velocity ensure the comfortableness for the passenger at the head position on the seat.

Figure 4:
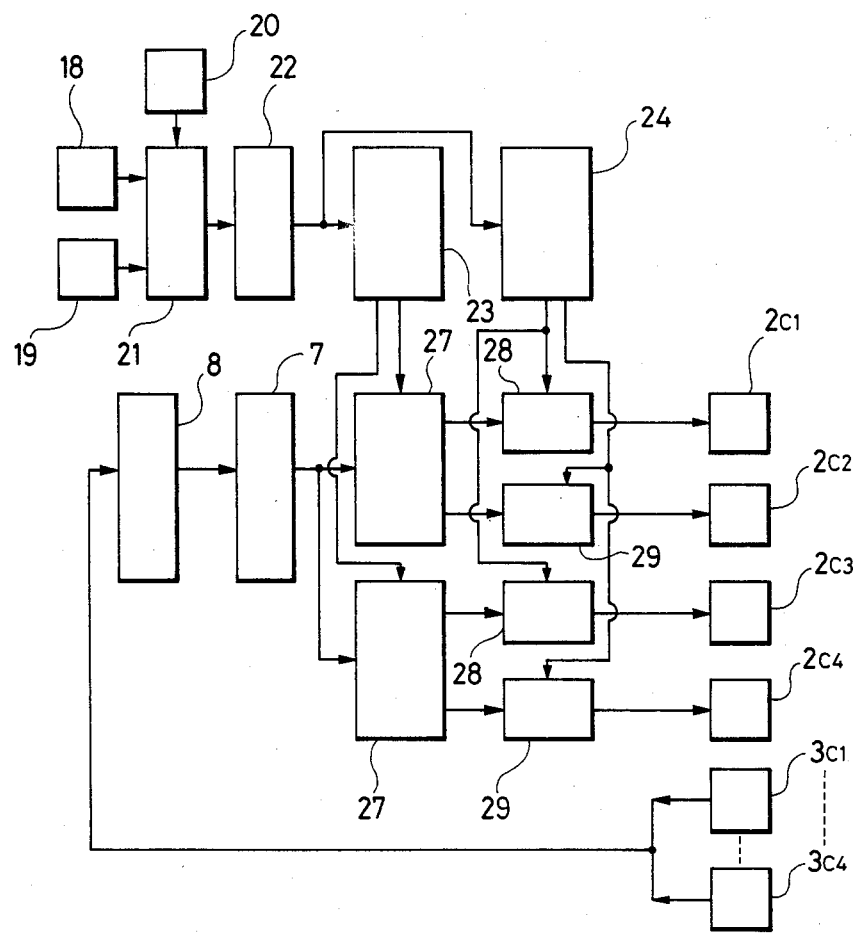
FIG. 4 is a block diagram of the functions of the system for generating the circulating flows of FIGS. 1(a), 1(b) and 1(c)
Figure 5:
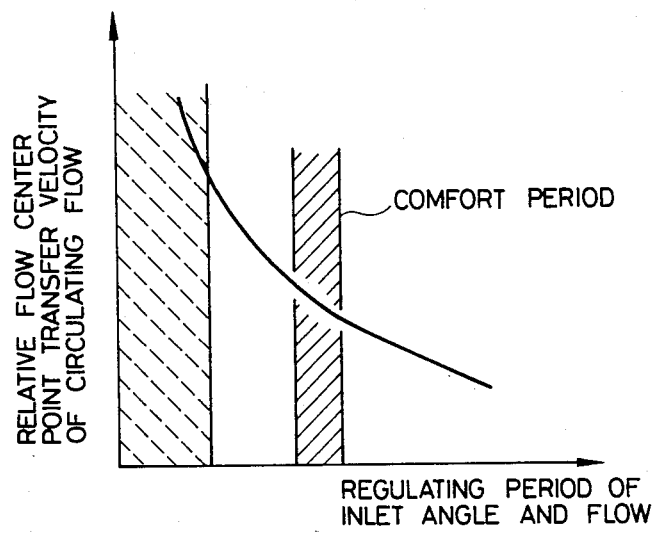
FIG. 5 is a graph indicating preferable situations which enable the human body to feel coolness.

The embodiment shown in FIGS. 14 to 17 has been described its cooling operation in the car. The heating operation in the car may be carried out by switching the cooler, which is shown in FIG. 4, into a heater, and the ceiling outlets $2_{C1}$ and $2_{C2}$ shown in FIG. 12 may be employed. For the heating in the car, heated air can be blown through the floor inlets $3_{F1}$ and $3_{F2}$ shown in FIG. 14 instead of the blowing through the outlets in the ceiling $1a$. In this case, the direction of the rotation of each circulating flow occurring in the transverse direction of the car is reverse to that of the circulating flow indicated in FIG. 12. In the car heating operation, a hot atmosphere region is formed in the vicinity of the ceiling whether the air is blown from the side of the ceiling or from the side of the floor. Such a hot atmosphere region can be destroyed by the effect of the arrangement in accordance with the present, thereby achieving uniform temperature distribution in the passenger accommodation space.

In the embodiment shown in FIGS. 14 to 17, during cooling or heating in the passenger accommodation, two circulating flows different in size are generated in the transverse direction of the car and the center of each circulating flow is moved so as to periodically changing the flow velocity at the passenger's head, thus improving the comfortableness for the passenger. The cold atmosphere region which tends to occur near the floor at the time of cooling and the hot atmosphere which tends to occur near the ceiling at the time of heating can be destroyed by moving the center of each of the above two circulating flows, so that uniform temperature distribution in the passenger accommodation can be achieved easily. Even when the temperature distribution is disturbed by the heat entering or going out during opening and closing movement of the entrance door of the passenger accommodation, the temperatures on the sides of the ceiling and the floor are detected and the outlet flow angle regulation period is reduced. It is thereby possible to destroy, in a short time, the cold atmosphere region near the floor or the hot atmosphere region near the ceiling. The temperature distribution in the passenger accommodation is thereby uniformized in a short time.

The air-conditioning system for the train passenger car has been described as an example of a cooling or heating operation in a mobile space for passengers. Other examples of mobile spaces for passengers include buses, airplanes, etc. Such mobile spaces have different seat numbers and arrangements, but the method of air-conditioning train passenger cars such as shown in FIGS. 14 and 15 is also applicable to these cases.

Figure 1:
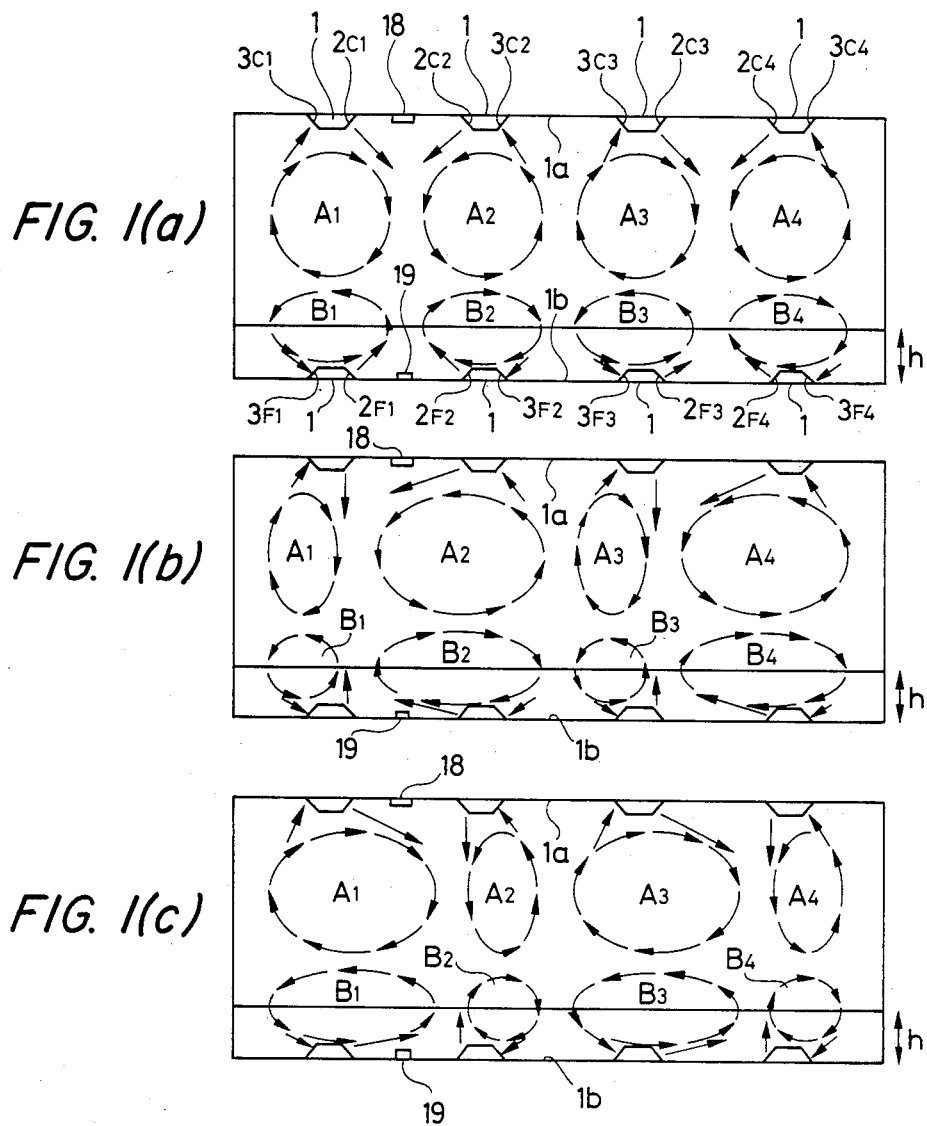
FIGS. 1(a), 1(b), 1(c) are elevational views of an embodiment of the present invention in which circulating flows in a space to be air-conditioned are represented by vectors.

When the present invention is applied to the cooling operation of a large cold storage, the cooling system thereof corresponds to the arrangement shown in FIG. 1 except for the floor outlets $2_{F1 \sim F4}$. This system periodically changes the flow angle and flow rate at the ceiling outlets $2_{C1}$ and $2_{C2}$ in accordance with the graph of FIG. 2 so as to change the position of each cold air flow colliding with cold-storage goods. The thermal boundary layers on the cold-storage goods are thereby destroyed so that the cold-storage goods can be uniformly cooled. The size of each of the circulating flows $A_{1 \sim 4}$ is changed in accordance with the height of the cold-storage goods. The corresponding flow rates at the outlets $2_{C1 \sim C4}$ are regulated with a flow rate regulation valve. This arrangement is effective when applied to a cold storage for frequently taking in and out small packages.

It is also applicable to the thawing of frozen foods. It is possible to destroy the thermal boundary layers on the frozen foods and thaws the same in a short time by generating circulating flows and changing the size and the center position thereof.

If a pure fluid control device capable of readily controlling the outlet flow angle and the outlet flow rate in the three-dimensional directions, the flow velocity control in the direction of the head positions of audience in a theater exhibits variousness, thereby further improving the comfortableness. In all embodiments of the present invention, the generation of large and small vortices and the movement of the same can be achieved by employing the devices shown in FIGS. 7 and 10.

Each embodiment of the present invention can move, in a vertical sectional plane, the center of a plurality of circulating flows having different sizes, in cooling or heating operations in an very large space such as a theater or in a mobile space for passengers. Different temperature regions thereof which tend to stagnate near the floor of the ceiling can be eliminated in a short time. Thus, the control of air for providing uniform temperature distribution in an air-conditioned space can be effectively performed. In addition, it is possible to periodically change the flow velocity of the wind contacting the heads of audience or passengers, thereby making the audience or passengers feel more comfortable. In the arrangement of a large cold storage in accordance with the present invention, cold-storage goods can be uniformly cooled, thus saving energy. The invention also enables frozen food to be thawed speedily, when applied to the thawing of frozen foods.

According to the present invention, as described above, the center of each of a plurality of circulating flows is moved so as to eliminate uneveness of the temperature in an air-conditioned space, thereby improving the air-conditioning effects.

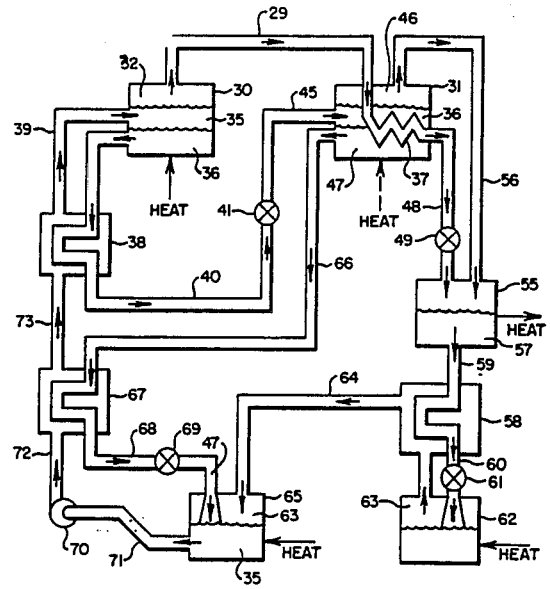

What is claimed is:

1. A method of air-conditioning which forms, in a space to be air-conditioned, a plurality of continually colliding circulating flows of air respectively blown through air outlets of an air-conditioning system disposed at predetermined separated positions within said space, said method comprising: a first step of changing the effective range of at least one of said plurality of circulating flows by means of changes in air flow rate and air flow angle while maintaining continual collision thereof; and a second step of returning said at least one of said circulating flows as effected in the first step to said effective range of said at least one of said circulating flows which obtained before the first step, wherein said first and second steps are successively repeated.

2. A method of air-conditioning according to claim 1, comprising: a first step of changing the size of one of said circulating flows to a larger size or a smaller size relative to other ones of said circulating flows; and a second step of inverting the relationship in size between said circulating flows changed in size in the first step, wherein said first and second steps are successively repeated.

3. A method of air-conditioning according to claim 1 or 2, comprising: a first step of changing one of adjacent vectors in vectors of air flows blown through said air outlets, and changing the other one of said adjacent vectors in the direction reverse to that of said change of said one of said adjacent vectors; and a second step of effecting a vector relationship reverse to that effected in the first step, wherein said first and second steps are successively repeated.

4. An air-conditioning system which forms, in a space to be air-conditioned, a plurality of continually colliding circulating flows of air respectively blown through air outlets of an air-conditioning system disposed at predetermined separated positions within said space, said system comprising: a first means for changing the effective range of at least one of said circulating flows by means of changes in air flow rates and air flow angles while maintaining continual collision thereof and returning said at least one of said circulating flows ass changed to the effective range thereof which obtained before the range was changed; and a second means for conducting the repetition of the two effects of said first means.

5. An air-conditioning system according to claim 4, comprising: a first means for changing one of adjacent vectors in vectors of air flows blown through said air outlets, and changing the other one of said adjacent vectors in the direction reverse to that of said change of said one of said adjacent vectors; and a second means for effecting a vector.

* * * * *

United States Patent [19]

Reid, Jr. et al.

[11] Patent Number: 4,742,693
[45] Date of Patent: May 10, 1988

[54] ABSORPTION REFRIGERATION AND HEAT PUMP SYSTEM

[75] Inventors: Edward A. Reid, Jr., Westerville; F. Bert Cook, Columbus; Stephen P. Cremean, Gahanna, all of Ohio; Richard H. Merrick, Newburgh, Ind.; Edgar M. Purvis, Troy, Ohio

[73] Assignee: Columbia Gas System Service Corp., Wilmington, Del.

[21] Appl. No.: 945,090

[22] Filed: Dec. 22, 1986

Related U.S. Application Data

[63] Continuation-in-part of Ser. No. 683,187, Nov. 13, 1984, Pat. No. 4,646,541.

[51] Int. Cl.$^4$ .............................................. F25B 15/00
[52] U.S. Cl. ..................................... 62/476; 62/238.3
[58] Field of Search .................... 62/476, 238.3, 324.2, 62/79, 148

[56] References Cited

U.S. PATENT DOCUMENTS

| | | | |
|---|---|---|---|
| 2,196,911 | 4/1940 | Getaz | 62/476 X |
| 3,828,575 | 8/1974 | Malcosky et al. | 62/476 |
| 4,085,595 | 4/1978 | Saito et al. | 62/476 |
| 4,183,228 | 1/1980 | Saito et al. | 62/476 X |
| 4,402,795 | 9/1983 | Erickson | 62/476 X |
| 4,424,688 | 1/1984 | Wilkinson | 62/476 |
| 4,458,499 | 7/1984 | Grossman | 62/476 X |
| 4,475,361 | 10/1984 | Alefeld | 62/476 |
| 4,548,048 | 10/1985 | Reimann et al. | 62/476 X |
| 4,551,991 | 11/1985 | Miyoshi et al. | 62/476 |

*Primary Examiner*—Lloyd L. King
*Attorney, Agent, or Firm*—Robert B. Watkins

[57] ABSTRACT

This invention relates to a cooling and heating system which operates on the absorption and phase change heat exchange principle. More particularly it relates to a continuous heat actuated, air cooled, double effect generator cycle, absorption system. In further aspects, this invention relates to a system constructed for use with an absorption refrigeration solution pair consisting of a nonvolatile absorbent and a highly volatile refrigerant which is highly soluble in the absorbent. A disclosed refrigerant pair are ammonia as the refrigerant and sodium thiocyanate as the absorbent. An absorption cycle is disclosed using the thermo physical properties of sodium thiocyanate/ammonia, absorption/refrigerant pair. Also disclosed is the construction and configuration of a reverse cycle air cooled double effect generator absorption refrigeration system for use with the sodium thiocyanate/ammonia refrigeration pair, as well as subcompositions, subsystems and components that improve the system efficiency and reduce cost.

14 Claims, 8 Drawing Sheets